United States Patent
Trantham et al.

(10) Patent No.: US 8,504,860 B2
(45) Date of Patent: Aug. 6, 2013

(54) SYSTEMS, METHODS AND DEVICES FOR CONFIGURABLE POWER CONTROL WITH STORAGE DEVICES

(75) Inventors: Jon David Trantham, Chanhassen, MN (US); Christopher Thomas Cole, Bloomington, MN (US)

(73) Assignee: Seagate Technology LLC, Cupertino, CA (US)

( * ) Notice: Subject to any disclaimer, the term of this patent is extended or adjusted under 35 U.S.C. 154(b) by 1060 days.

(21) Appl. No.: 12/493,025

(22) Filed: Jun. 26, 2009

(65) Prior Publication Data

US 2010/0332860 A1    Dec. 30, 2010

(51) Int. Cl.
G06F 1/00  (2006.01)
G06F 1/26  (2006.01)

(52) U.S. Cl.
USPC .......................................... 713/340; 713/300

(58) Field of Classification Search
USPC ................................................. 713/300–340
See application file for complete search history.

(56) References Cited

U.S. PATENT DOCUMENTS

| | | |
|---|---|---|
| 4,510,400 A | 4/1985 | Kiteley |
| 5,367,489 A | 11/1994 | Park et al. |
| 5,459,850 A | 10/1995 | Clay et al. |
| 5,483,486 A | 1/1996 | Javanifard et al. |
| 5,497,119 A | 3/1996 | Tedrow et al. |
| 5,537,360 A | 7/1996 | Jones et al. |
| 5,546,042 A | 8/1996 | Tedrow et al. |
| 5,567,993 A | 10/1996 | Jones et al. |
| 5,592,420 A | 1/1997 | Cernea et al. |
| 5,914,542 A | 6/1999 | Weimer et al. |
| 5,959,926 A | 9/1999 | Jones et al. |
| 6,091,617 A | 7/2000 | Moran |
| 6,404,647 B1 | 6/2002 | Minne' |
| 6,567,261 B2 | 5/2003 | Kanouda et al. |
| 6,700,352 B1 | 3/2004 | Elliott et al. |
| 6,788,027 B2 | 9/2004 | Malik |
| 6,838,923 B2 | 1/2005 | Pearson |
| 6,862,651 B2 * | 3/2005 | Beckert et al. ................ 711/103 |
| 6,957,355 B2 * | 10/2005 | Acton et al. ................... 713/340 |
| 6,981,161 B2 | 12/2005 | Koo |
| 7,019,583 B2 | 3/2006 | Del Signore, II et al. |
| 7,051,216 B2 * | 5/2006 | Suzuki et al. ................. 713/300 |
| 7,173,821 B2 | 2/2007 | Coglitore |
| 7,177,222 B2 | 2/2007 | Spengler |
| 7,233,890 B2 | 6/2007 | Shapiro et al. |
| 7,268,998 B2 | 9/2007 | Ewing et al. |
| 7,269,755 B2 * | 9/2007 | Moshayedi et al. ............... 714/2 |

(Continued)

OTHER PUBLICATIONS

N. Li, J. Zhang, and Y. Zhong, "A Novel Charging Control Scheme for Super Capacitor Energy Storage in Photovoltaic Generation System," DRPT2008 Apr. 6-9, 2008 Nanjing China.

(Continued)

Primary Examiner — Paul R Myers
Assistant Examiner — Trisha Vu

(57) ABSTRACT

Power is routed from one or more power supplies. As consistent with one or more example embodiments, a data storage device senses and/or is informed of the availability and voltage level of one or more power supplies. Based upon the availability and voltage level of power supplies, circuits in the memory device are powered using one or more of the sensed power supplies. In some applications, the power is drawn in a manner that emulates the behavior of one or more circuits that are respectively powered.

24 Claims, 3 Drawing Sheets

U.S. PATENT DOCUMENTS

| | | |
|---|---|---|
| 7,305,572 B1 | 12/2007 | Burroughs et al. |
| 7,310,707 B2 | 12/2007 | Olds et al. |
| 7,318,121 B2 | 1/2008 | Gaertner et al. |
| 7,321,521 B2 | 1/2008 | Spengler |
| 7,334,144 B1 | 2/2008 | Schlumberger |
| 7,404,073 B2 | 7/2008 | Felts |
| 7,404,131 B2 | 7/2008 | McCarthy et al. |
| 7,414,335 B2 | 8/2008 | Hussein et al. |
| 7,484,109 B2 * | 1/2009 | Feldman et al. ............. 713/300 |
| 7,487,391 B2 | 2/2009 | Pecone et al. |
| 7,802,121 B1 * | 9/2010 | Zansky et al. ................ 713/340 |
| 2004/0268166 A1 * | 12/2004 | Farkas et al. ................. 713/320 |
| 2006/0080515 A1 | 4/2006 | Spiers et al. |
| 2006/0136765 A1 * | 6/2006 | Poisner et al. ............... 713/323 |
| 2006/0212644 A1 * | 9/2006 | Acton et al. ................. 711/103 |
| 2007/0223870 A1 | 9/2007 | Farling et al. |
| 2008/0007219 A1 | 1/2008 | Williams |
| 2008/0189484 A1 * | 8/2008 | Iida et al. .................... 711/114 |
| 2008/0232144 A1 | 9/2008 | Klein |
| 2009/0006877 A1 | 1/2009 | Lubbers et al. |
| 2010/0167557 A1 * | 7/2010 | Hoang ........................... 439/62 |
| 2010/0205470 A1 * | 8/2010 | Moshayedi et al. .......... 713/340 |

OTHER PUBLICATIONS

ECNmag.com, "1.2A, 1.6MHz Synchronous Boost Regulator from Linear Technology," Top News, Jan. 8, 2009.

Intel® Mainstream SATA Solid State Drives, "Intel® X25-M and X18-M Mainstream SATA Solid-State Drives".

"Get the Lowdown on Ultracapacitors," Penton Media, Inc., Nov. 15, 2007.

STMicroelectronics, "Regulating Pulse Width Modulators, SG3524," Jul. 2000.

Linear Technology, "1.2A Synchronous Step-up DC/DC Converter with Input Current Limit, LTC3125," 2008.

* cited by examiner

SYSTEMS, METHODS AND DEVICES FOR CONFIGURABLE POWER CONTROL WITH STORAGE DEVICES

FIELD OF THE INVENTION

Aspects of the present invention relate to power control features that can be useful for data storage applications in which power draw is an important issue.

BACKGROUND

Computer systems generally have several levels of memory; each level of memory can provide differing levels of speed, memory capacity, physical size, cost, power requirements, voltage levels and/or volatility. These aspects are often at odds with each other. For example, increases in speed often lead to corresponding increases in power requirements. For this reason, many systems use a variety of different memories within the same system. From the perspective of a computer program these memories are often hidden in the sense that common data is temporarily cached in smaller and faster memory circuits. This common data is mapped to larger and slower memory circuits, which are accessed when the faster memory does not contain the desired data. The common data, if changed in the cached memory, can eventually be written to the larger and slower memory circuits. This allows for the slower memory's access time to be avoided or hidden, so long as the faster memory contains the appropriately mapped data.

Computer systems generally contain some type of mass-storage nonvolatile memory that is able to retain stored data when the computer system is powered down. This type of memory is referred to as nonvolatile memory because it is able to maintain data integrity when the computer system is not powered. Nonvolatile memory, however, may be slower by orders of magnitude relative to various volatile memories. Yet, nonvolatile can also be less expensive (per unit of memory capacity) and/or less power-hungry. A common type of nonvolatile mass-storage memory device is a hard disc drive (HDD) that uses a rotating magnetic media for data storage. HDDs are used for home computers, servers, workstations, consumer-electronics and various other devices. Under normal operation a computer system transfers data requiring nonvolatile retention from temporary memory to a HDD before the computer system is powered down. This allows for the system's data to be retained after the power is removed from the computer system. When the computer system is subsequently powered up, this data can be accessed and used by the computer system.

HDDs with rotating magnetic media have been in use for many years and have undergone various improvements including efficiency, reliability and data storage capacity. Various applications, however, are beginning to use other types of mass data storage devices with more frequency. Solid State Drives (SSDs), using electronic nonvolatile memory, such as flash, are one such type of device, and are attractive for many applications. Speed, cost and power requirements also factor into the selection of data storage devices such as SSDs or HDDs.

While SSDs are useful in a multitude of applications, aspects of their operation and implementation remain challenging. For example, SSDs are often used in environments that have been designed for operation with other types of circuits and/or drives such as HDDs, which often operate at voltages that may or may not be amenable to use with different types of circuits. In many instances, available power sources do not necessarily match the power requirements of SSDs, or otherwise involve additional power sources that may be unused in certain circumstances, such as when design circuitry is replaced with replacement circuitry (e.g., when an HDD is replaced with a SSD). Powering SSDs in an efficient, reliable and inexpensive manner has been challenging.

SUMMARY

The present invention is directed to systems and methods for use with power control features of memory applications in which data integrity is an issue. These and other aspects of the present invention are exemplified in a number of illustrated implementations and applications, some of which are shown in the figures and characterized in the claims section that follows.

Consistent with one embodiment of the present invention, a data storage device is configured to operate using power from two or more different power supplies respectively operating at different voltages. Based upon available power supplies, the device draws power to power various memory circuits and their related functions. In some applications, this approach involves detecting available power supplies and their respective voltages and, in response to the detection, routing power to one or more circuits from the available power supplies. This approach may further involve modifying the voltage of a particular power supply, such as by reducing or boosting the voltage to a level that is amenable for use by a particular memory circuit.

Another example embodiment is directed to a data storage device that is configured to use different power supplies operating at different voltages to store and provide access to data under the control of a memory control circuit. The data storage device includes a solid-state primary memory, a solid-state caching memory, an energy storage circuit and a power control circuit. The primary memory maintains data integrity in the absence of operating power (e.g., is a non-volatile memory), and the caching memory is mapped to the primary memory and provides the memory control circuit with access to a set of data representing a cached portion of memory that is mapped to the primary memory circuit. The energy storage circuit includes a capacitor circuit that holds a charge to supply power for powering internal circuitry, such as the caching memory, upon loss of external power. The power control circuit identifies available power supplies operating at different voltages and identifies at least one of the circuits in the memory device to power with each of the respectively-identified power supplies, based upon the voltage of the supplies. The power control circuit further (directly or indirectly) routes power from the identified power supplies to the at least one identified circuit.

Various other embodiments are directed to methods relating to the above, combinations of the above circuits and functions, and variations upon the same, as may be relevant to one or more of controlling the routing of power, regulating power for use at a particular circuit component, emulating a particular power draw behavior, or otherwise controlling the use and routing of operating power.

The above summary is not intended to describe each illustrated embodiment or every implementation of the present invention. The figures and detailed description that follow, including that described in the claims, more particularly exemplify these embodiments.

BRIEF DESCRIPTION OF THE DRAWINGS

The invention may be more completely understood in consideration of the detailed description of various embodiments of the invention that follows in connection with the accompanying drawings as follows.

Figure 1:
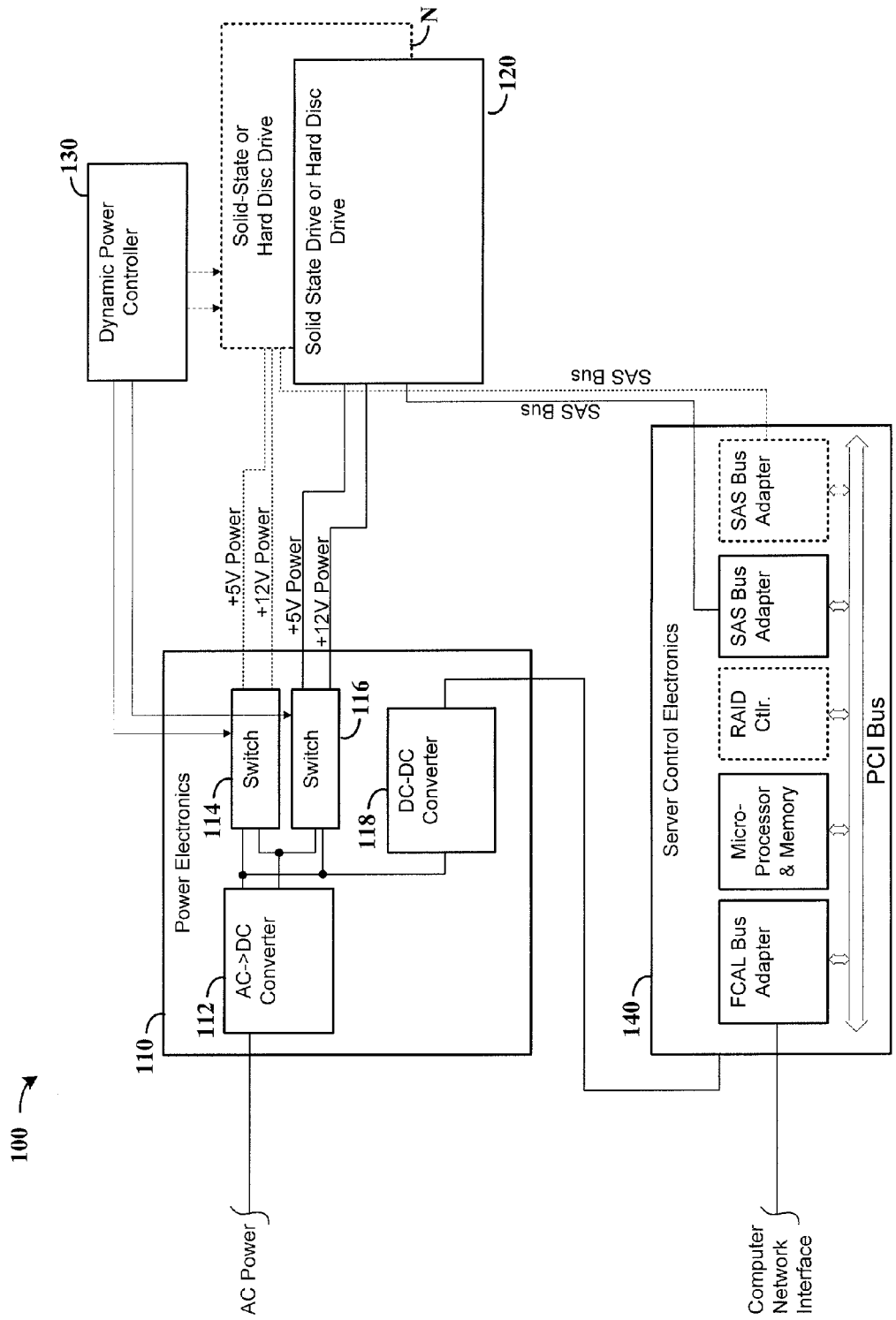
FIG. 1 shows a data storage system configured for operating one or more solid-state data storage devices using different power sources, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present invention are believed to be useful for controlling power for circuits for memory devices, energy storage components, circuits and systems thereof. A particular application of the present invention relates to solid state drives (SSDs) that provide nonvolatile data storage functions. While the present invention is not necessarily limited to such applications, various aspects of the invention may be appreciated through a discussion of various examples using this context.

According to an example embodiment of the present invention, a SSD-type data storage device includes a power controller that is configured to route power to internal circuits from two or more power supplies operating at different voltages, based upon the availability of the power supplies and the respective requirements of the internal circuits to which the power is routed. For instance, one such device is configured to operate using a power supply at about 5V, using a single power supply operating at about 12V, and concurrently using two power supplies respectively operating at 5V and 12V. When operating off of both a 5V and 12V supplies, the device is capable of drawing a balance of power from both supplies and/or delaying operation until power from both supplies is available, which may be effected to emulate the power draw of another circuit such as a rotating magnetic disk-drive. In some applications, the SSD-type devices use one or more algorithm-type configurations that are predefined for operating with different types of power supplies (respectively operating at different voltages), to route power and, where appropriate, regulate or otherwise configure the routed power for use by internal circuits.

In various embodiments, an SSD device is configured for operation with data storage enclosures such as servers or workstations having differing types of power supplies. In one implementation, the SSD device is configured for implementation in data storage enclosures having power supplies that are designed for other types of circuits such as HDDs (hard disk drives), such as for interchanging with HDDs to provide relative storage characteristics. The SSD-type device is configured for use in replacing a variety of types of HDDs operating in different systems respectively using power supplies that provide power at differing voltages. Upon activation, the SSD device detects available power supplies and their respective voltages, and controls its use of power based upon these detected characteristics and internally-programmed power configurations.

In another implementation, the SSD-type data storage device is configured for implementation in different types of new data storage devices, such as a new data server product, and draws power based upon the type of data storage device for which it is implemented. This approach may be carried out in a manner similar to that discussed above, wherein the SSD data storage device discovers (or is informed of) the type of available power in the system in which it is implemented and accordingly executes an appropriate power configuration. This approach is applicable, for example, to the manufacture of large servers or workstations involving multiple product lines, each of which may vary in power supply characteristics and/or which may employ power supplies that are not predictable.

In some applications, the SSD data storage device selects and implements a power configuration that effects a current draw that emulates the current draw from a particular type of HDD that it is replacing or that a particular circuit is otherwise used for (or accordingly limits current draw based upon the same), based upon one or more factors such as the detected power supplies. This approach may thus involve using a less efficient power source than other available power sources, yet is useful to emulate behavior to suit a particular circuit design.

In this regard, a single type (or a limited number of types) of SSD devices can be used in a variety of different types of systems. By supporting a plurality of configurations, the SSD-type device can be configured (e.g., via firmware) once the type of system in which it is to operate is discovered or otherwise conveyed.

The following discussion of the Figures and the embodiments shown therein represent exemplary implementations of various embodiments, which may be implemented in connection with one or more approaches as described above, in connection with other figures and/or in the claims section that follows. Many different combinations of memory circuits, power supplies, control circuits and other device/system circuits may be used in accordance with various aspects of the present invention, and may involve one or more of the systems and/or approaches as shown in the figures. In addition, various discussion refers to "memory" and/or "data storage," where one or both terms may refer to similar or the same types of devices and systems, as well understood in the relevant art.

FIG. 1 shows a data storage system 100 configured for operating one or more solid-state or hard disc drives using different power sources, according to an example embodiment of the present invention. The system 100 includes power electronics 110 that are configured to control the supply of power to storage drives 120-N, which may include one or both of HDDs and SSDs. Server control electronics 140 perform storage management functions, such as data access control, system environmental monitoring, and drive failure management, by controlling server functions relating to one or more different types of circuits that may be present in the system, with various circuits such as those pertaining to memory and communications shown by way of example.

A dynamic power controller 130 operates to control the routing of power from one or more supplies to the storage drives 120-N via the power electronics 110, depending upon the type and voltage of the available power supplies (e.g., different sources or supply lines). While shown separately, the power controller 130 may be implemented in connection with one or more of the circuits as shown, such as by implementation within an SSD at 120.

The power electronics 110 include one or more of a variety of circuits and power sources that provide power for use by the system 100. By way of example, FIG. 1 shows an AC/DC converter 112, switches 114 and 116, and DC-DC converter 118 as part of the power electronics. Also by way of example, each of the switches 114 and 116 are shown as switching power as either a +5V or +12V power supply, yet may be operated at other voltage levels in place of and/or in addition to those shown by way of example.

Generally, the dynamic power controller 130 operates to route power from the power electronics, either directly or via control of one or more components in the system 100, based upon the available power and requirements of the SSD and as further may be applicable to power requirements of the particular drive to which power is routed. As discussed above, the dynamic power controller 130 may route power to emulate the power draw of a particular circuit based upon a particular configuration.

One or more aspects of the dynamic power controller 130 or other components of the system 100 may be implemented in connection with the device 200 shown in FIG. 2, aspects of the device 200, or other related approaches described as follows.

Figure 2:
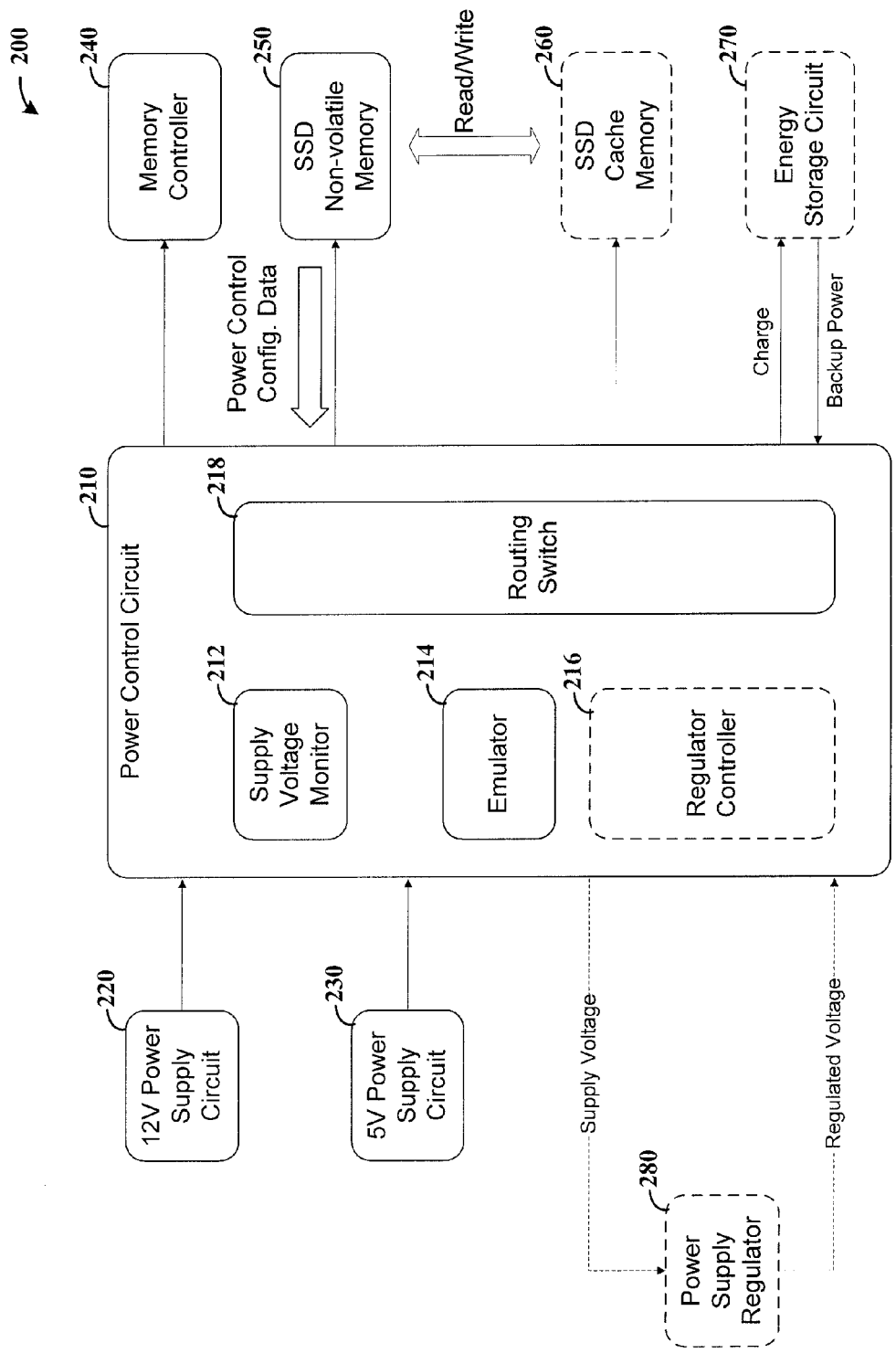
FIG. 2 shows a solid-state data storage device with dynamically configurable power source selection and operation, according to another example embodiment of the present invention.

FIG. 2 shows a solid-state data storage device 200 with dynamically configurable power source selection and operation, according to another example embodiment of the present invention. The device 200 includes a power control circuit 210 that operates to route power from different supply circuits, including +12V and +5V supplies 220 and 230 shown by way of example, to one or more circuits in a SSD-type device. The power control circuit 210 may be operated separately from, or in connection with, the SSD device, which also includes memory controller 240 and SSD non-volatile memory 250. The SSD device may further include SSD cache memory 260 and an energy storage circuit 270, the latter of which stores energy for operating the device (or portions of the device) in response to a power interruption, for instance, by charging a capacitor or rechargeable battery when power is applied and then using the stored energy upon the loss of power.

Figure 3:
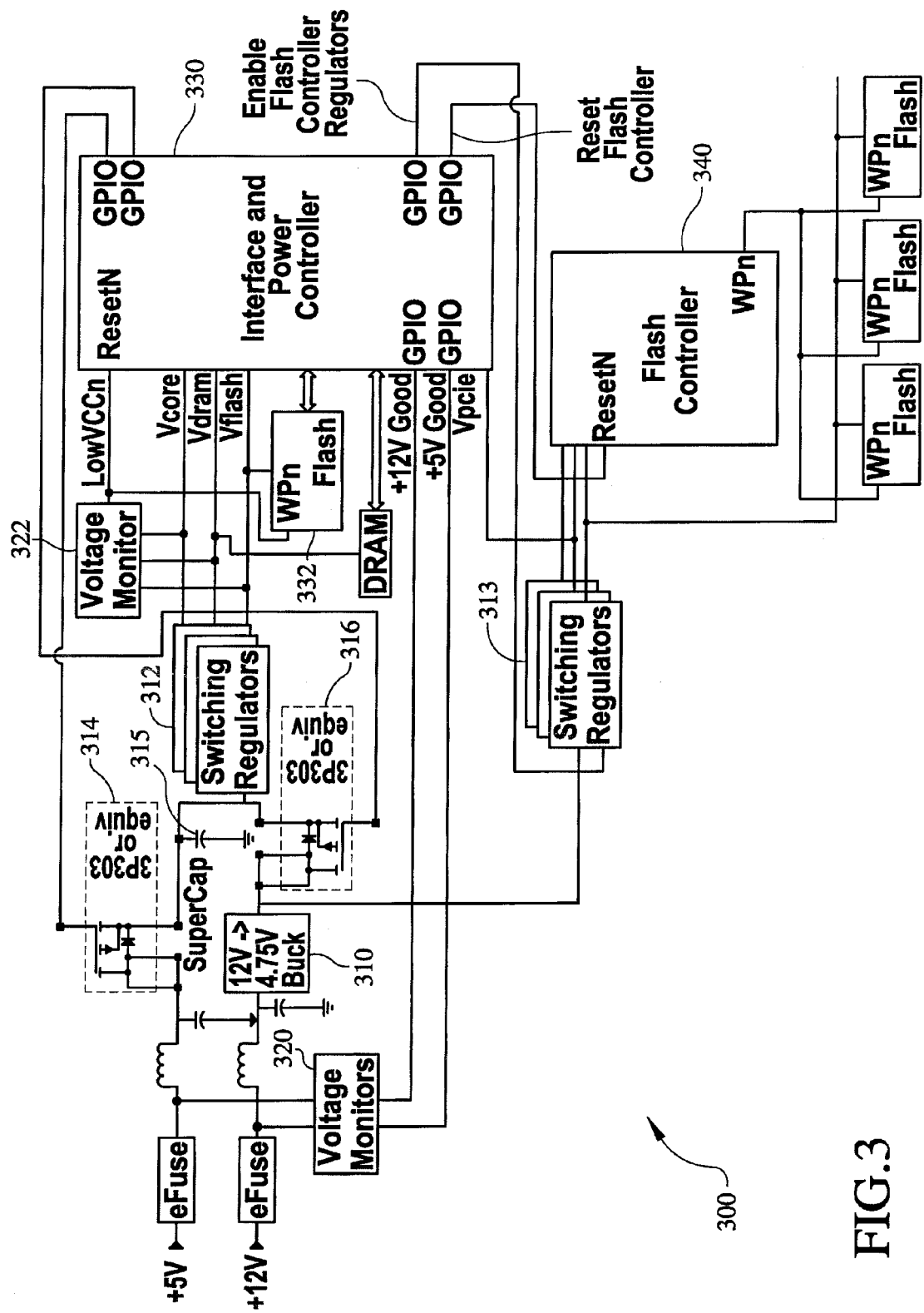
FIG. 3 shows a solid-state data storage device with dynamically configurable power source selection and operation, according to another example embodiment of the present invention.

The power control circuit 210 includes a supply voltage monitor 212, an emulator 214, a regulator controller 216 (and corresponding power supply regulator circuitry 280), and a routing switch 218. While shown integral to the power control circuit 210, one or more of these components may be implemented in another arrangement, such as in-line with an incoming power supply rail, with an outgoing power supply circuit or as part of another component as shown or otherwise. For example, the switching can be performed utilizing DC-to-DC regulators with integrated device-enable control functionality. One such alternate arrangement involves combining the power control circuit 210 with an SSD-type device for use in either replacing an existing storage drive or as an initial drive installed during manufacture. Another such arrangement may be implemented in connection with the device 200 as shown in FIG. 3 and discussed below.

The supply voltage monitor 212 monitors available supply voltages for detecting available power. The power control circuit 210 uses information from the supply voltage monitor 212 to identify available power supplies and their respective voltages, and to operate the routing switch 218 to route power to one or more circuits in the device, such as circuits 240-270.

In some applications, the supply voltage monitor 212 also detects variations in the voltage of available power supplies. For instance, one implementation involves detecting the presence of power supplies and, after the initial detection, waiting for a delay period and subsequently detecting the voltage level of the supply. This approach is useful, for example, for allowing the power supply voltage to settle under conditions such as startup in which the voltage level may fluctuate.

In other applications, the supply voltage monitor 212 dynamically monitors the availability of power supplies to detect that a new power supply is becoming available and/or that an existing power supply has become unavailable. For example, when a power supply fails, the supply voltage monitor 212 detects and reports the failure. In response, the power control circuit 210 operates the routing switch 218 to route power from another power supply to circuits that had previously been powered with the power supply that failed. This failure-responsive routing may also be carried out using configuration data or emulation data that pertains to the new configuration that does not involve the failed power supply.

In some embodiments, the power control circuit 210 reads power control configuration data (e.g., algorithm-type information) from the SSD non-volatile memory 250 and executes power routing functions based upon the configuration data. For instance, where the configuration data specifies that power be drawn from one or both of the power supply circuits 220 and 230 and provided to a certain component in the system, the power control circuit 210 controls the routing switch 218 to route power accordingly. This configuration data may thus be selected based upon the number and type (i.e., voltage) of available power supplies and/or the number and type of circuit components to be powered. The power control circuit 210 can accordingly identify components of the system 200 to power with each power supply identified by the supply voltage monitor 212, based upon each respective circuit's ability to operate under one or more different voltages and the respective voltage levels of the identified power supplies as relative to the configuration data.

The emulator 214 is (selectively) operated to emulate a particular type of power draw behavior, in accordance with one or more example embodiments. Such emulation may involve, for example, drawing certain power levels and/or drawing certain power levels at certain times, and further drawing such power at different voltages. For instance, where the device 200 is inserted as a replacement device for another type of drive such as an HDD drive, the emulator 214 can operate to emulate power draw from the respective power supply circuits 220 and 230 in a manner that is similar to that of the drive that was replaced. In some instances, the emulator 214 uses configuration data read from the SSD non-volatile memory 250 to control power draw from the respective power supply circuits 220 and 230 in accordance with a particular emulation configuration.

In some embodiments, the power control circuit 210 limits the current draw from one or more power supplies, which may also be set using configuration data read from the SSD non-volatile memory 250. For instance where the power supply circuit 220 requires that current it supplies be limited to a particular threshold, the power control circuit 210 can operate the routing switch 218 to limit the current accordingly. In certain applications, current draw is limited to emulate a particular load using the emulator 214 in a similar manner.

Where current is limited yet additional power is needed, the power control circuit 210 then routes additional power from another power supply. For instance, where the 5V power supply circuit 230 reaches its current threshold yet components are in need of power at 5V, the power control circuit 210 fills that need by drawing power from the 12V power supply circuit 220 and, if appropriate, regulates the power down to 5V using the regulator controller 216 and the power supply regulator circuitry 280.

In certain embodiments that involve the energy storage circuit 270, the power control circuit 210 is further configured to route power stored in the energy storage circuit to one or more circuits in response to a loss of power. For instance, where one or both of the 12V and 5V power supply circuits 220 and 230 are lost due to a power outage, the power control circuit can operate the routing switch 218 to route power from the energy storage circuit 270. If one or both of the power supply circuits 220 and 230 come back online, the supply voltage monitor 212 detects this event and the power control circuit 210 routes available power accordingly.

The regulator controller 216 controls the regulation of supplied power using power supply regulator circuitry 280, where such regulation is needed for a particular component and/or to achieve a particular type of operation as may be relative, for example, to configuration data or a particular type of emulation. For instance, where the voltage required by one or more components in the device 200 is about 5V yet power is drawn from the 12V power supply circuit 220 to suit the required power, the regulator controller 216 operates the power supply regulator to regulate the 12V supply down to about 5V (e.g., 4.75V), which is routed by the routing switch 218 to an appropriate component.

As discussed above, the various power control features as described in connection with various example embodiments herein can be implemented with different types of circuits for different applications. FIG. 3 shows one such circuit, involving a solid-state data storage device with dynamically configurable power source selection and operation, according to another example embodiment of the present invention. Generally, power is supplied from one or both of 5V and 12V power supply lines.

During manufacture of the data storage device 300, its power operating mode(s) are programmed into the flash at 332. There are many possible power operating modes that can be programmed. For instance, the device can be programmed to run only when both +5V and +12V power supplies are present, it can be programmed to run when either supply is present, and it can be programmed to run only when a particular power supply is present.

FET switches 314 and 316 couple the respective power supplies using integrated diodes, such that if the FETs are switched off, the diodes will be forward biased and conducting if external power is applied to either supply. This allows sufficient energy to reach the switching regulators at 312 in order to boot an interface & power controller 330. The device boots in a lower power-consumption state, servicing host commands to the storage media after its operating mode and available power supplies are determined.

Once the power controller 330 is booted, it utilizes information passed from voltage monitors at 320, along with algorithms and data stored in flash 332, to determine the device's operating mode and whether it is permitted to begin service commands (and consume much higher power.) The power controller 330 uses this information to determine whether to turn on FETs 314 and/or 316 to reduce the losses from the forward voltage drop of the body diode and to route power within the system. For example, if both +5V and +12V supplies are present, FET 314 can be turned on so that the +5V power will supply regulators 312, and +12V power will supply regulators 313. If only +5V is present, both FETs can be turned on so +5V powers both regulators 312 and 313, and the buck regulator 310 is turned off to prevent +5V energy from leaking out of the device on the +12V rail. If +12V is present and +5V is not present, switch 316 is turned on and switch 314 is turned off so that the +12V supply powers both switching regulators 312 and 313.

If power is lost, the power controller 330 turns off the FET switch 314 and buck regulator 310, and uses the energy in the supercapacitor at 315 to provide energy to complete data storage operations and flush cached data from volatile memory to non-volatile memory.

The device in FIG. 300 may also be configured with an emulator such as emulator 214, with disk-drive emulation accomplished by choosing the loads off of regulators 312 and 313, such that the current drawn on the +5V line and the +12V line are within the power envelope of a hard disc drive. Depending upon the power consumption of the components in the system, alternative designs can place load devices differently.

The various embodiments described and shown herein are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. For instance, such changes may include combining various detection, routing and power-related circuits, powering different types of circuits, powering directly with indirect control, powering indirectly with direct control, and others as relevant to the operation of data storage circuits and of energy storage circuits used for operating backup functions of data storage circuits. Such modifications and changes do not depart from the true spirit and scope of the present invention, including that set forth in the following claims.

What is claimed is:

1. A removable data storage device that stores and retrieves data in response to external control comprising:
   a data memory;
   control circuitry for the data memory;
   at least one electrical connector configured to connect at least one power supply to power the device; and
   a power control circuit configured and arranged to
      identify available power supplies and the respective and different voltages at which the available power supplies operate,
      control the device operation based upon identified power supplies and the identified different voltages, and
      route power from the identified power supplies to circuits within the device as a function of the identified different voltages.

2. The device of claim 1, wherein the data memory is solid state memory.

3. The device of claim 1, wherein the data memory is rotating magnetic media.

4. The device of claim 1, further comprising additional solid-state memory configured and arranged to provide the memory control circuit with access to a set of data representing a cached portion of memory that is mapped to the data memory.

5. The device of claim 1, wherein the data memory is non-volatile memory, further comprising
   volatile solid-state memory configured and arranged to provide the memory control circuit with access to a set of data representing a cached portion of memory that is mapped to the data memory, and
   energy storage circuitry configured and arranged to supply power to the device in the event of power loss to retain data that is in the volatile memory.

6. The device of claim 1, wherein
   a portion of the data memory stores a plurality of algorithms that, when executed, control power-routing functions of the power control circuit based upon the identified power supplies and circuits to power in the data storage device, and the power control circuit is configured and arranged to read, select and execute one the algorithms, based upon the identified power supplies and circuits, to route power from the identified power supplies to the identified circuit.

7. The device of claim 1, wherein the power control circuit is configured and arranged to select one of the circuits within the device to power with each identified power supply based upon each respective circuit's ability to operate under one or more different voltages and the respective voltage levels of the identified power supplies.

8. The device of claim 1, wherein the power control circuit is programmed with an algorithm to identify the available power supplies and their respective voltages, identify at least one of the circuits within the data storage device that can operate at one of the identified voltages, and route power from an identified power supply operating at the one of the identified voltages to the identified at least one circuit.

9. The device of claim 1, wherein the power control circuit is configured and arranged to identify available power supplies operating at different voltages by, after initially identifying the voltage of an available power supply, delaying for a delay time period and, after the delay, detect the voltage of the available power supply.

10. The device of claim 1, wherein the power control circuit is configured to read power configuration data from the data memory and route power from the identified power supplies to circuits in the data storage device based upon the configuration data and the voltages of the respectively-identified power supplies.

11. The device of claim 1,
further including a power supply regulator circuit configured to regulate the voltage from the power supplies to a different voltage and to provide the different voltage to the circuits within the device, and
wherein the power control circuit is configured and arranged to selectively route power from one of the identified power supplies through the power supply regulator to regulate the voltage from the power supply to a voltage level that is set based upon operating characteristics of at least one of the circuits in the device to which the power is being routed.

12. The device of claim 1, wherein the power control circuit is configured and arranged to, in response to a loss in power from one of the power supplies, route power from another one of the power supplies to a circuit that had previously been powered with the power supply from which power was lost.

13. The device of claim 1, wherein the power control circuit is configured and arranged to route power to one of the circuits within the device from one of the identified power supplies by limiting the current drawn from the one of the identified power supplies to a threshold current.

14. The device of claim 1, wherein the power control circuit is configured and arranged to route power to one of the circuits in the device from two different power supplies by
regulating the voltage of at least one of the two different power supplies to match the voltages, and
limiting the current drawn from at least one of the two power supplies to a threshold current.

15. The device of claim 1, wherein the power control circuit is configured and arranged to route power by selectively routing power from one of the identified power supplies in order to limit the current drawn from another one of the identified power supplies to a threshold current.

16. The device of claim 1, wherein the power control circuit is configured and arranged to selectively route power from the identified power supplies to the circuits to emulate power draw in a predefined manner that is different than a natural power draw from the circuits in the data storage device.

17. The device of claim 1, wherein the data memory is solid state memory and wherein the power control circuit is configured and arranged to selectively route power from the identified power supplies to the circuits to emulate the power draw of a rotating magnetic media hard disc drive.

18. The device of claim 1, wherein the power control circuit is configured and arranged to selectively route power from the identified power supplies to the circuits based on timing characteristics relative to a datum to emulate power draw in a predefined manner.

19. A power controller circuit for a solid-state memory device that stores data in response to data accesses under the control of a memory control circuit, the power controller circuit comprising:
a power supply sensing circuit configured to sense the presence and voltage level of available power supplies;
a configuration circuit that stores configuration data that specifies power draw and switching operations for a plurality of different combinations of power supplies and that is programmed to retrieve configuration data based upon the power supplies and their respective voltage levels as sensed by the sensing circuit; and
a power router configured and arranged to switch power from at least two different power supplies to power different circuits in the solid-state memory device according to the retrieved configuration data.

20. The circuit of claim 19, wherein the configuration circuit is programmed to
store sets of the configuration data in a non-volatile memory circuit, each set pertaining to a particular combination of available power supplies,
select a set of the configuration data based upon the power supplies and their respective voltage levels as sensed by the sensing circuit, and
execute the configuration data with an algorithm to control the power router for switching power.

21. The device of claim 20, wherein the configuration circuit is programmed to select one or more circuits to power with each sensed power supply based upon each respective circuit's ability to operate under one or more different voltages and the respectively sensed voltage levels of the sensed power supplies.

22. A method for controlling power distribution in a solid-state memory device that stores data in response to data accesses under the control of a memory control circuit, the method comprising:
sensing the presence and voltage level of available power supplies;
storing configuration data that specifies power draw and switching operations for a plurality of different combinations of power supplies;
retrieving configuration data based upon the power supplies and their respective voltage levels as sensed by the sensing circuit; and
switching power from at least two different power supplies to power different circuits in the solid-state memory device according to the retrieved configuration data.

23. The method of claim 22, further including
storing sets of the configuration data in a non-volatile memory circuit, each set pertaining to a particular combination of available power supplies, selecting a set of the configuration data based upon the power supplies and their respective voltage levels as sensed by the sensing circuit, and executing the configuration data with an algorithm to control a power router for switching power.

24. The method of claim 22, wherein switching power includes selecting one or more circuits to power with each sensed power supply based upon each respective circuit's ability to operate under one or more different voltages and the respectively sensed voltage levels of the sensed power supplies, and powering each of the selected circuits with the sensed power supply for which the circuit is selected.

* * * * *